US008660947B2

(12) United States Patent
Duncan

(10) Patent No.: US 8,660,947 B2
(45) Date of Patent: *Feb. 25, 2014

(54) INVOICELESS TRADING AND SETTLEMENT METHOD AND SYSTEM

(75) Inventor: William James Duncan, Hampton (AU)

(73) Assignee: Fast 101 Pty Ltd., Hampton, Victoria (AU)

( * ) Notice: Subject to any disclaimer, the term of this patent is extended or adjusted under 35 U.S.C. 154(b) by 497 days.

This patent is subject to a terminal disclaimer.

(21) Appl. No.: 12/030,141

(22) Filed: Feb. 12, 2008

(65) Prior Publication Data

US 2008/0201268 A1     Aug. 21, 2008

Related U.S. Application Data

(60) Continuation of application No. 11/653,306, filed on Jan. 16, 2007, now Pat. No. 7,716,130, which is a division of application No. 09/561,990, filed on May 2, 2000, now Pat. No. 7,266,525.

(30) Foreign Application Priority Data

May 3, 1999   (AU) ...................... PQ0102

(51) Int. Cl.
G06Q 40/00     (2012.01)
(52) U.S. Cl.
USPC ............................. 705/40; 705/38
(58) Field of Classification Search
USPC ........................................ 705/40
See application file for complete search history.

(56) References Cited

U.S. PATENT DOCUMENTS 4,713,761 A    12/1987  Sharpe et al.
4,799,156 A     1/1989  Shavit et al.
(Continued)

FOREIGN PATENT DOCUMENTS

EP    0308224 A2    3/1989
JP    11149503      6/1999
(Continued)

OTHER PUBLICATIONS

Ritter, Jeffrey B; Defining International Electronic Commerce; Apring/Summer 1992; Northwestern Journal of International Law & Business; 13, 1; ABI/INFORM Global p. 3.*
Lobaugh, Jean L; Paperless Payables Pays Off; Sep. 1996; Management Accounting; 78, 3; ABI/INFORM Global p. 31.*
Stevens, Tim; The Smart Office; Jan. 17, 1994; Industry Week; 243, 2; ABI/INFORM Global p. 31.*

(Continued)

Primary Examiner — Olabode Akintola
Assistant Examiner — Michael Cranford
(74) Attorney, Agent, or Firm — Jason H. Vick; Sheridan Ross, PC

(57) ABSTRACT

Methods and systems consistent with the present invention overcome the shortcomings of existing trading systems by providing an invoiceless trading system that creates incentives for customers to pay suppliers within a predetermined period of time, such as a settlement period. Specifically, the invoiceless trading system enables a customer to obtain a discount on orders placed with suppliers in return for an immediate payment (e.g., within 24 hours) by the customer. The supplier receives payment within the predetermined period of time, and the customer receives additional cash benefits by providing an early payment to the supplier. To communicate with and transfer funds between customers and suppliers, the invoiceless trading system may use an electronic gateway and a settlement bank. In addition to creating an incentive to embrace e-commerce, both customers and suppliers avoid the need to manually process orders and use invoices to complete transactions.

160 Claims, 6 Drawing Sheets

(56) References Cited

U.S. PATENT DOCUMENTS

| | | | |
|---|---|---|---|
| 4,812,628 A | 3/1989 | Boston et al. | |
| 4,941,090 A | 7/1990 | McCarthy | |
| 4,947,028 A | 8/1990 | Gorog | |
| 5,025,372 A | 6/1991 | Burton et al. | |
| 5,117,355 A | 5/1992 | McCarthy | |
| 5,202,826 A | 4/1993 | McCarthy | |
| 5,222,018 A | 6/1993 | Sharpe et al. | |
| 5,287,268 A | 2/1994 | McCarthy | |
| 5,291,396 A | 3/1994 | Calcerano et al. | |
| 5,293,310 A | 3/1994 | Carroll et al. | |
| 5,362,948 A | 11/1994 | Morimoto | |
| 5,383,113 A * | 1/1995 | Kight et al. | 705/40 |
| 5,465,206 A | 11/1995 | Hilt et al. | |
| 5,483,445 A | 1/1996 | Pickering | |
| 5,550,734 A | 8/1996 | Tarter et al. | |
| 5,671,279 A | 9/1997 | Elgamal | |
| 5,671,280 A * | 9/1997 | Rosen | 705/67 |
| 5,684,965 A | 11/1997 | Pickering | |
| 5,710,887 A | 1/1998 | Chelliah et al. | |
| 5,717,989 A | 2/1998 | Tozzoli et al. | |
| 5,732,400 A | 3/1998 | Mandler et al. | |
| 5,734,838 A | 3/1998 | Robinson et al. | |
| 5,740,427 A | 4/1998 | Stoller | |
| 5,757,917 A | 5/1998 | Rose et al. | |
| 5,758,328 A | 5/1998 | Giovannoli | |
| 5,758,329 A | 5/1998 | Wojcik et al. | |
| 5,794,207 A | 8/1998 | Walker et al. | |
| 5,794,221 A | 8/1998 | Egendorf | |
| 5,801,365 A | 9/1998 | Katz | |
| 5,802,497 A | 9/1998 | Manasse | |
| 5,825,881 A | 10/1998 | Colvin, Sr. | |
| 5,870,724 A | 2/1999 | Lawlor et al. | |
| 5,920,847 A | 7/1999 | Kolling et al. | |
| 5,933,817 A | 8/1999 | Hucal | |
| 5,970,475 A | 10/1999 | Barnes et al. | |
| 5,974,207 A | 10/1999 | Aksyuk et al. | |
| 6,006,199 A | 12/1999 | Berlin et al. | |
| 6,014,635 A | 1/2000 | Harris et al. | |
| 6,057,872 A | 5/2000 | Candelore | |
| 6,061,660 A | 5/2000 | Eggleston et al. | |
| 6,064,987 A * | 5/2000 | Walker et al. | 705/38 |
| 6,078,104 A | 6/2000 | Sakurai | |
| 6,081,790 A | 6/2000 | Rosen | |
| 6,167,378 A | 12/2000 | Webber, Jr. | |
| 6,167,385 A | 12/2000 | Hartley-Urquhart | |
| 6,233,565 B1 | 5/2001 | Lewis et al. | |
| 6,360,211 B1 * | 3/2002 | Anderson et al. | 705/40 |
| 6,385,595 B1 * | 5/2002 | Kolling et al. | 705/40 |
| 6,606,744 B1 * | 8/2003 | Mikurak | 717/174 |
| 6,996,535 B1 | 2/2006 | Ono et al. | |
| 7,069,234 B1 | 6/2006 | Cornelius et al. | |
| 7,165,174 B1 | 1/2007 | Ginter et al. | |
| 7,266,525 B1 | 9/2007 | Duncan | |
| 7,340,433 B1 | 3/2008 | Kay et al. | |
| 7,716,130 B2 | 5/2010 | Duncan | |
| 2001/0051919 A1 | 12/2001 | Mason | |
| 2002/0026394 A1 * | 2/2002 | Savage et al. | 705/34 |
| 2006/0178918 A1 | 8/2006 | Mikurak | |
| 2006/0248016 A1 | 11/2006 | Ginter et al. | |

FOREIGN PATENT DOCUMENTS

| | | |
|---|---|---|
| KR | 1998-042911 | 8/1998 |
| KR | 1999-013861 | 2/1999 |
| WO | WO 96/21192 | 7/1996 |
| WO | WO 98/14921 A1 | 4/1998 |
| WO | WO 98/28699 A1 | 7/1998 |
| WO | WO 00/67167 A1 | 11/2000 |

OTHER PUBLICATIONS

Nicos et al, Pay and Save, Accountancy, Jun. 1999, vol. 123, Issue 1270, p. 92.
New Ways with the Old Bill, Corporate Finance, Sep. 2000, Issue 190, p. 10.
Glassanos, When Less is More: Rethinking the Accounts Payable Balance, AFP Exchange, May/Jun. 2003, vol. 23, Issue 3, p. 30.
Sirbu, Marvin et al., "NetBill: An Internet Commerce System Optimized for Network-Delivered Services", IEEE Personal Communications, Aug. 1995, pp. 34-39.
Prime Revenue: "Supply Chain Finance Flexible, Robust Solutions," from http://www.primerevenue.conn/what/products/supply.html printed on Feb. 9, 2006.
The Business Journal of Phoenix, Dec. 24, 1999, (author unknown), pp. 1-4 Cash-flow tips that could keep business afloat.
Chaum & Brands "Minting Electronic Cash: Electornic Equivalents of Traditional Cash Payment Systems are Being Launched Worldwide," IEEE Spectrum, vol. 34, No. 2, pp. 30-34, Feb. 1997.
Stahl, Stephanie "EDI is Habit-Forming for RJR Tobacco" Jan. 11, 1993.
Wood, M. "Electronic Banking Services for the Financial Community," Abstract, 1984, pp. 21-32.
Notice of Acceptance for Australian Patent Application No. 40925, mailed Apr. 7, 2003.
The First Notification of Examiner's Written Opinion (including translation) for Chinese Patent Application No. 00807035.0, mailed Nov. 1, 2002.
Declaration Under Rule 45 EPC for European Application No. 00920269.8, mailed Jun. 14, 2002.
Official Action for European Application No. 00920269.8, mailed Jun. 29, 2004.
First Examination Report for Indian Patent Application No. IN/PCT/2001/00911/DEL, mailed May 18, 2004.
Examination Report for Indian Patent Application No. IN/PCT/2001/00911/DEL, mailed Mar. 24, 2005.
Examination Report for Indian Patent Application No. IN/PCT/2001/00911/DEL, mailed May 17, 2005.
Notice of Refusal (including translation) for Korean Application No. 10-2001-7012979, mailed May 23, 2006.
Notice of Allowance (including translation) for Korean Application No. 10-2001-7012979, mailed Dec. 13, 2007.
Examination Report for New Zealand Patent Application No. 514906, mailed May 30, 2002.
Official Action (including translation) for Mexican Patent Application No. PA/a/2001/01142, mailed Dec. 3, 2004.
Official Action for U.S. Appl. No. 09/561,990, mailed Jul. 2, 2003.
Official Action for U.S. Appl. No. 09/561,990, mailed Jan. 6, 2004.
Official Action for U.S. Appl. No. 09/561,990, mailed Jul. 6, 2004.
Official Action for U.S. Appl. No. 09/561,990, mailed Dec. 29, 2004.
Official Action for U.S. Appl. No. 09/561,990, mailed Sep. 12, 2005.
Restriction Requirement for U.S. Appl. No. 09/561,990, mailed Feb. 27, 2006.
Notice of Allowance for U.S. Appl. No. 09/561,990, mailed Oct. 18, 2006.
Official Action for U.S. Appl. No. 11/653,306 mailed Sep. 19, 2007.
Official Action for U.S. Appl. No. 11/653,306 mailed Jun. 25, 2008.
Official Action for U.S. Appl. No. 11/653,306 mailed Jan. 7, 2009.
Official Action for U.S. Appl. No. 11/653,306 mailed Aug. 4, 2009.
Notice of Allowance for U.S. Appl. No. 11/653,306 mailed Mar. 4, 2010.
W.J. Duncan, "Invoiceless Trading and Settlement method and System", International Search Report, PCT/AU00/00387, Jun. 27, 2000.
W.J. Duncan, "Invoiceless Trading and Settlement method and System", International Preliminary Examination Report, PCT/AU00/00387, Nov. 24, 2000.
U.S. Appl. No. 13/839,941, filed Mar. 15, 2013, Duncan.
Lobaugh, Jean L. "Paperless Payables Pays Off" Management Accounting, vol. 78, Issue 3, Sep. 1996, ABI/INFORM Global, p. 31.
Ritter, Jeffrey B. "Defining International Electronic Commerce" Spring/Summer 1992; Northwestern Journal of International Law & Business, vol. 13, Issue 1; ABI/INFORM Global p. 3.
Stevens, Tim "The Smart Office" Industry Week, vol. 243, Issue 2, Jan. 17, 1994, ABI/INFORM Global p. 31.
Notice of Allowance for U.S. Appl. No. 13/839,941, mailed Jul. 8, 2013.

* cited by examiner

INVOICELESS TRADING AND SETTLEMENT METHOD AND SYSTEM

RELATED APPLICATIONS

This application is a continuation of U.S. patent application Ser. No. 11/653,306, filed Jan. 16, 2007, now U.S. Pat. No. 7,716,130, which is a divisional of U.S. patent application Ser. No. 09/561,990, filed May 2, 2000, now U.S. Pat. No. 7,266,525, which claims the benefit under 35 U.S.C. 119(a) to Australian Patent Application No. PQ0102, filed May 3, 1999, each of which are incorporated by reference herein in their entirety.

BACKGROUND OF THE INVENTION

A. Field of the Invention

This invention relates generally to data processing systems, and more particularly, to electronic trading and settlement systems.

B. Description of the Related Art

Conventional trading and settlement systems generally involve large corporate customers, commercial suppliers, and large financial institutions (e.g., settlement banks). These systems trade using large amounts of paper. That is, conventional trading and settlement systems create "paper trails" that serve to lengthen a business transaction from the initial order to the final payment.

For example, a customer may place an order (e.g., a purchase order) with a supplier. Once the supplier receives the order, the supplier creates a packing slip, and ships the order to the customer. With the shipment of the order, the supplier includes an invoice for the order. The invoice generally requires payment within a standard time period set by the supplier (e.g., 30 days). In practice, however, many customers may take up to 60 days to settle their outstanding accounts with suppliers. Thus, it may take over two months from the time a customer places an order and it is shipped to the time the supplier receives a payment. Aside from the reduced cash flow and/or credit risk born by the supplier before receipt of payment, the customer must process (either manually or electronically) each invoice and account with the supplier.

In response to the inherent problems with conventional trading and settlement systems, more and more suppliers and/or customers are switching to the Internet, and trading and settling "online." That is, systems such as supply side trading systems that use normal trading terms (e.g., remit payment 30 days) offered by business solution firms, such as ORACLE, COMMERCE ONE, or ARIBA.

Although these electronic trading and settlement systems create an electronic marketplace that enables both customers and suppliers to trade online, the trading system does so at a high price. That is, unless all parties (e.g., customers, suppliers, settlement banks) are "wired," the benefits of electronic trading and settling is not realized. In other words, it may be that the customer has built a large infrastructure capable of complete automated ordering, however, unless the supplier has reciprocal functionality, the customer must resort to more conventional ordering (e.g., paper purchase orders) to engage the supplier. Although the benefits are obvious, nevertheless, both customers and suppliers have been slow to adopt electronic trading and settling. Thus, there is a need to for a system that encourages both suppliers and customers to adopt electronic trading and settlement capabilities.

Therefore, there exists a need to improve existing trading and settlement systems by enabling electronic invoiceless trading and settlement systems that provide incentives for both customers and suppliers to trade and settle electronically. Such a system should not only offer a tangible incentive to both customers and suppliers, but also it should place little to no risk on the settlement bank.

SUMMARY OF THE INVENTION

Methods and systems consistent with the present invention overcome the shortcomings of existing trading systems by providing an invoiceless trading system that creates incentives for customers to pay suppliers within a predetermined period of time, such as a settlement period. Specifically, the invoiceless trading system enables a customer to obtain a discount on orders placed with suppliers in return for an immediate payment (e.g., within 24 hours) by the customer. The supplier receives payment within the predetermined period of time, and the customer receives additional cash benefits by providing an early payment to the supplier. To communicate with and transfer funds between customers and suppliers, the invoiceless trading system may use an electronic gateway and a settlement bank. In addition to creating an incentive to embrace e-commerce, both customers and suppliers avoid the need to manually process orders and use invoices to complete transactions.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Figure 1A:
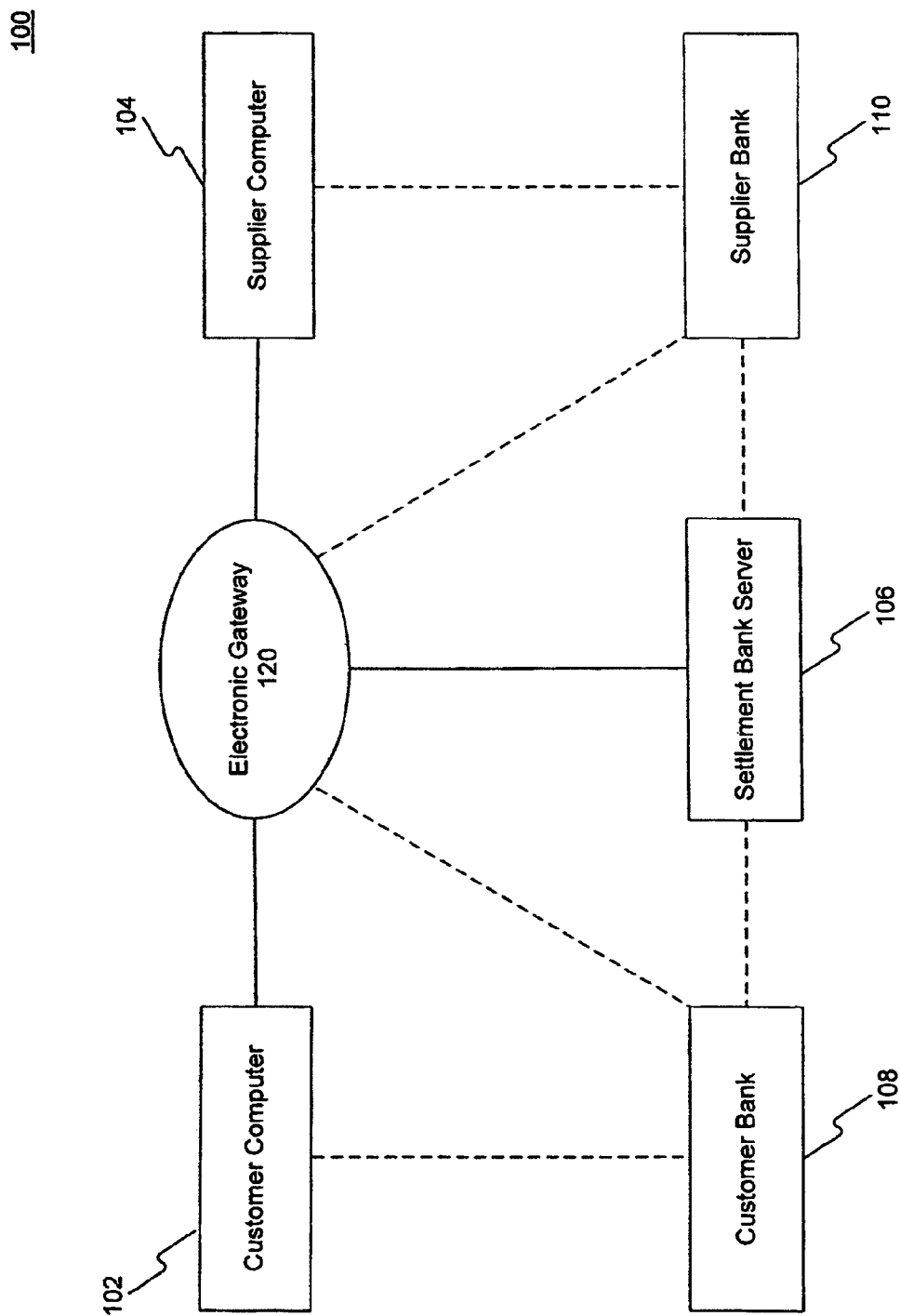
FIG. 1A depicts an invoiceless trading system suitable for practicing methods and systems consistent with the present invention.

The following detailed description of the invention refers to the accompanying drawings. Although the description includes exemplary implementations, other implementations are possible, and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Overview

Methods and systems consistent with the present invention provide an invoiceless trading system that provides incentives for customers to pay suppliers within a predetermined period of time, such as a settlement period. The customer and supplier prenegotiate an incentive amount to apply to each order. The invoiceless trading system draws an amount equivalent to the full face value of an order placed by the customer and filled by the supplier from a bank account associated with the customer. Periodically, the trading system rebates to the customer the prenegotiated amount. Such methods and systems provide discounts as an incentive to the customer so that the customer pays the supplier within a predetermined settlement period (e.g., one day).

The invoiceless trading and settlement system comprises a number of components, such as a customer bank, a settlement bank, a supplier bank, and an electronic gateway connecting a customer and a supplier.

A customer (e.g., corporation or governmental entity) places an order using an electronic gateway to purchase products from a supplier. Products are broadly defined as commodities, services, physical objects or goods, or any other item a supplier might sell to a customer. An order may be an electronic message delivered in any well-known financial communications format, such as HTTP, FTP, EDI, SMTP.

A supplier offers products to a plurality of customers. To entice the customer to promptly pay within a settlement date, the supplier offers an incentive to the customer, such as discounts, bonuses, prizes, and the like. To ensure accuracy of an order, the supplier immediately transmits an electronic message to the customer using the electronic gateway. A supplier may fill customer orders by any traditional means. For example, the supplier may "scan-pack" (described below). In addition to scan-packing, the supplier may transmit an electronic confirmation message (e.g., Advanced Shipping Notice, ASN) to the customer using the electronic gateway. The ASN is further described below.

A settlement bank, such as a corporate bank or any similar financial institution, pays the supplier at a time agreed in advance between the customer and the supplier. Once a customer transmits an authorization to the settlement bank to pay the supplier through the electronic gateway, the settlement bank lodges cleared funds for a specified amount (e.g., a discounted amount) in a supplier's bank. Cleared funds may be obtained from a customer's bank as a loan to the customer, withdrawal from a customer's deposit account, or the like.

An electronic gateway may be an independent entity or specific to the type of products being bought and sold. For example, in the case of a private network, an electronic gateway may include an administrator that exchanges, logs and translates messages between subscribing customers and subscribing suppliers. In the case of an open network, the electronic gateway may be the Internet. To provide security in an open network, a firewall or VPN may be used when connecting the customer, supplier, their respective banks, and the settlement bank. In addition, the electronic gateway may include translation, logging, and forwarding services to ensure the accuracy of all orders, payments, and notices. An example of an electronic gateway suitable for practicing methods and systems consistent with the present invention is the AT&T INTERCOMMERCE gateway, available from AT&T.

Invoiceless trading systems provide a number of benefits over traditional trading and settlement systems. First, invoiceless trading systems provide both customers and suppliers a tangible incentive to embrace e-commerce. Customers can generate additional profits by receiving a cash benefit for improving the cashflow to the supplier by authorizing the settlement bank to transfer an early payment to a supplier's bank accounts. The supplier may receive payment of an outstanding customer account within a short period, such as one business day of the settlement bank receiving instructions from the customer to settle the account.

Second, invoiceless trading systems significantly reduce the cost associated with supply chain trading for both customer and suppliers. By using an electronic gateway, not only does a supplier not have to produce invoices, followup on outstanding accounts, or process payments, but also the supplier can almost instantly receive funds since the settlement bank directly deposits the funds into the supplier's bank. Moreover, remittance advice can automatically be lodged into the supplier's accounting software. Customers may have access to electronic catalogs located on a supplier's system, and the customer may also receive automated and immediate confirmation of shipment.

Finally, the invoiceless trading system creates additional profits for both suppliers and customers. That is, the customer's balance sheet is used to generate additional profits for the customer through supplier discounts. It is the strength of the customer's balance sheet that enables suppliers to receive immediate payment and therefore have the incentive to use the invoiceless trading system. The customer's balance sheet is not adversely affected by paying its suppliers early as borrowed funds are used to discharge trade creditors, thus canceling out the additional liability of the borrowing. Thus, the balance sheet improves marginally as the net borrowing is less than the face value of the trade creditors discharged.

Moreover, the invoiceless trading system creates additional profits for the customer by providing a rebate from the settlement bank. Since the customer is generally a larger and stronger party than the supplier, the customer has a lower cost of funds. Thus, the difference between the cost and availability of funds to the customer and supplier largely determine the size of the supplier incentive (discount), and therefore the size of the rebate from the settlement bank. As part of their incentive from the supplier, the customer receives a rebate from the settlement bank based on the strength of the customer's balance sheet and credit rating.

System Components

FIG. 1A depicts an exemplary invoiceless trading system 100 suitable for practicing methods and systems consistent with the present invention. Invoiceless trading system 100 comprises a customer computer 102, a supplier computer 104, and a settlement bank server 106, all connected via an electronic gateway 120, such as the Internet. Also included in invoiceless trading system 100 are a customer bank computer 108 and a supplier bank computer 110. Bank computers 108, 110 may be directly connected to bank server 106, directly connected to customer 102 and supplier 104, or connected to both through electronic gateway 120. A customer may use customer computer 102 to place an order with a supplier for products. A supplier may use supplier computer 104 to receive and process orders and electronically transmit shipping notices to a customer computer 102. Although only one customer computer 102, and supplier computer 104 are depicted in system 100, one skilled in the art will appreciate that many more customers' and/or suppliers' computers may be connected into system 100.

Figure 1B:
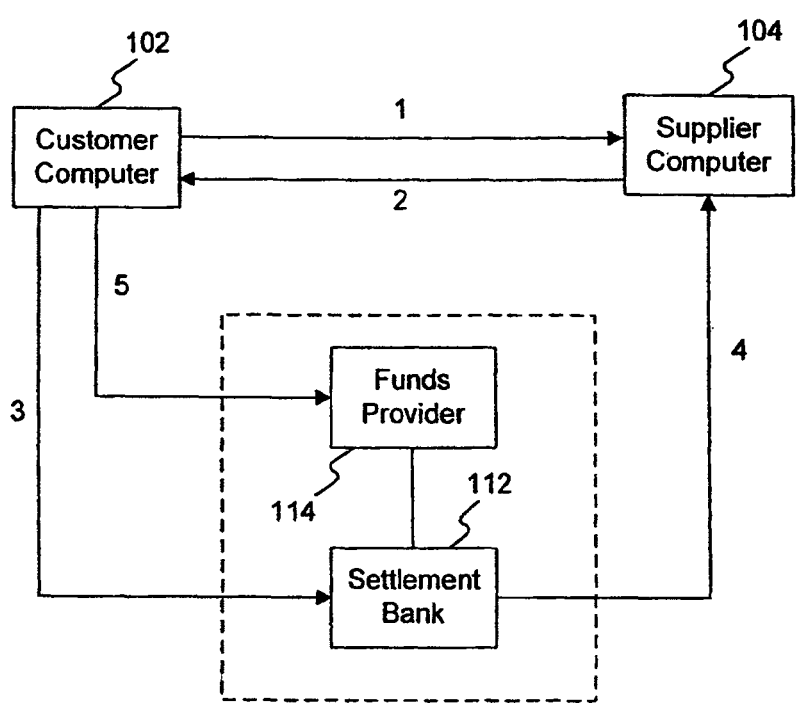
FIG. 1B depicts another embodiment of an invoiceless trading system suitable for practicing methods and systems consistent with the present invention.

FIG. 1B depicts another exemplary invoiceless trading system 150 for practicing methods and systems consistent with the present invention. Invoiceless trading system 150 comprises customer computer 102, supplier computer 104, a settlement bank 112, and a funds provider 114. In system 150, customer 102 may obtain an early payment discount for an order from supplier 104 by paying the supplier by a funds provider 114 via a settlement bank 112. In one embodiment, customer 102 may establish a settlement bank agreement with settlement bank 112 for settling orders placed by customer 102 by paying suppliers using funds provided by the funds provider 114. Customer 102 may also establish a funding agreement with funds provider 114, including, for example, a service fee and a rate of interest to be paid by customer 102 to funds provider 114. When customer 102 transmits an order message to supplier 104 with an order for an item, the customer 102 may then receive a shipping notification from supplier 104 indicating that the order has been filled. After the shipping notification is received by customer 102 from supplier 104, customer 102 may transmit a payment message to settlement bank 112 to make a discounted payment to supplier 104 for the order on a first date using funds from funds provider 114. In one example, the discounted payment may be equal to a cost for the order less an early payment discount agreed upon between customer 102 and supplier 104 based on supplier 104 receiving payments for the order with a predetermined period of time. After the first date, customer 102 may pay a negotiated payment, e.g., equal to the discounted payment plus the service fee and an interest amount, to funds provider 114. For example, the interest rate may be calculated based on a time period between the first date and the date on which the customer pays funds provider 114.

Figure 2A:
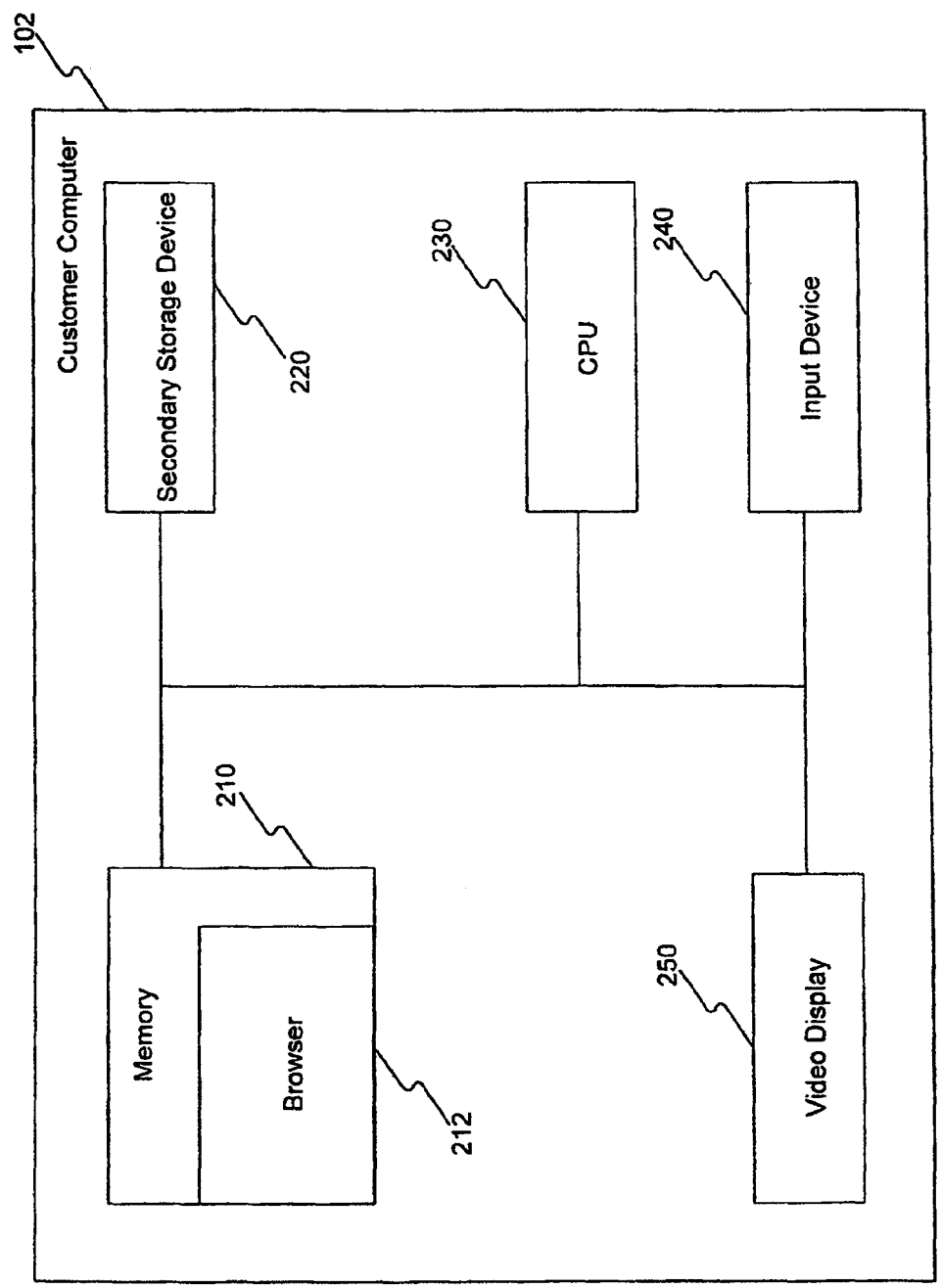
FIG. 2A depicts a more detailed diagram of the customer computer depicted in FIG. 1.

FIG. 2A depicts a more detailed diagram of customer computer 102, which contains a memory 210, a secondary storage device 220, a central processing unit (CPU) 230, an input device 240, and a video display 250. Memory 210 includes browser 212 that allows customers to interact with computer 104 and banks 106, 108 by transmitting and receiving files, such as Web pages. A Web page may include images or textual information to provide an interface to receive requests for products from a user using hypertext markup language (HTML), Java or other techniques. Examples of browsers suitable for use with methods and systems consistent with the present invention are the Netscape Navigator browser, from Netscape Communications Corp., and the Internet Explorer browser, from Microsoft Corp.

Figure 2B:
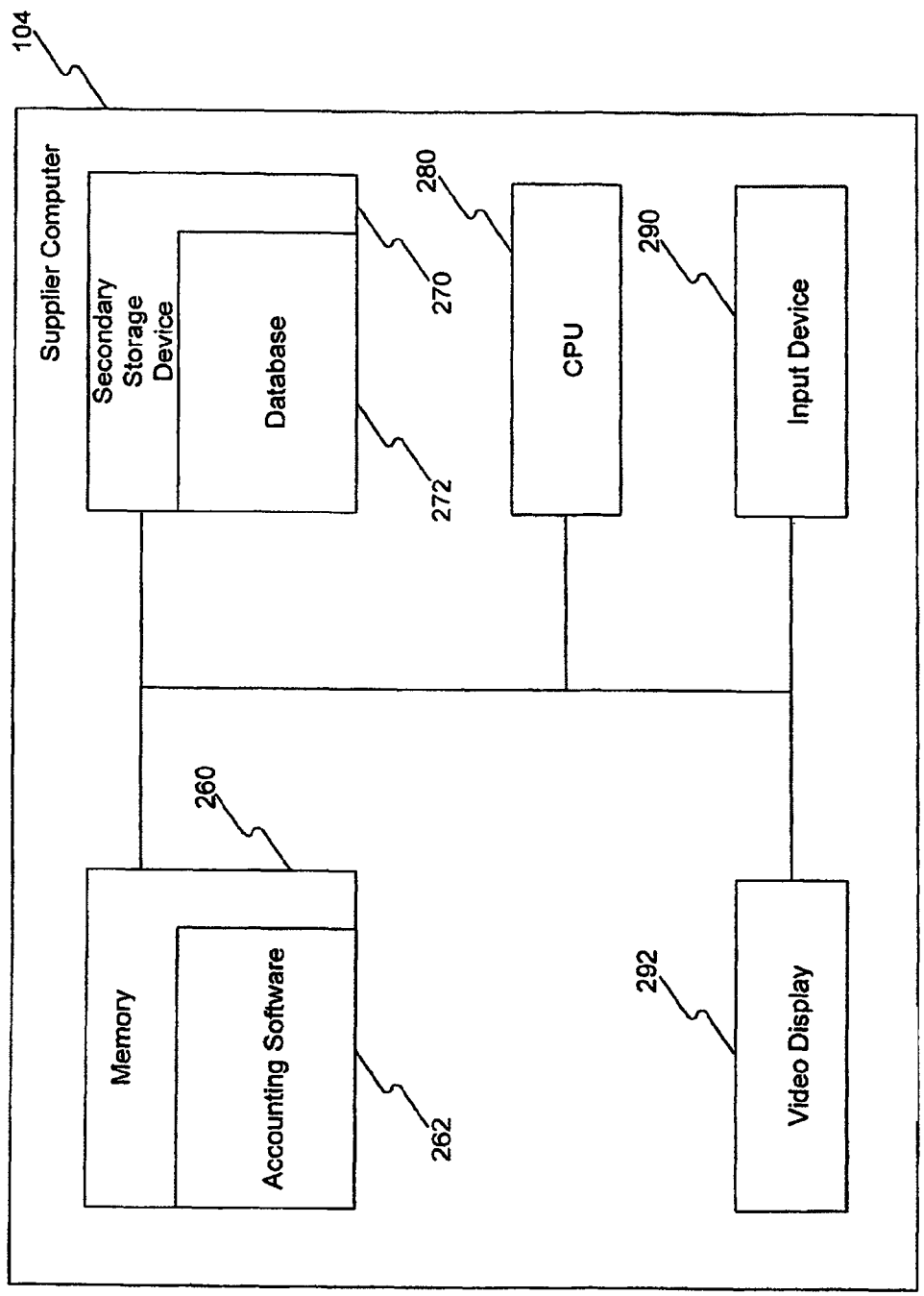
FIG. 2B depicts a more detailed diagram of the supplier computer depicted in FIG. 1.

As shown in FIG. 2B, supplier computer 104 includes a memory 260, a secondary storage device 270, a CPU 280, an input device 290, and a video display 292. Memory 260 includes accounting software 262 that processes received orders and creates ASNs for the customer. An ASN is a message sent to a customer upon shipment of goods. In addition, accounting software 262 contains a user interface (not shown) to communicate with computer 102 and bank servers 106, 110. The user interface may be a Web page, Application Program Interface (API), e-mail program, or other input interface. An API is a set of routines, protocols, or tools for communicating with software applications. APIs provide efficient access to accounting software 262 without the need for additional software to interface with the software. Web software, such as the APACHE Web software, or e-mail program, such as the Sendmail e-mail software, may also be included as a user interface to transmit and receive information. Secondary storage device 270 contains a database 272 that contains information relating to accounts receivables and accounts payables.

Figure 3:
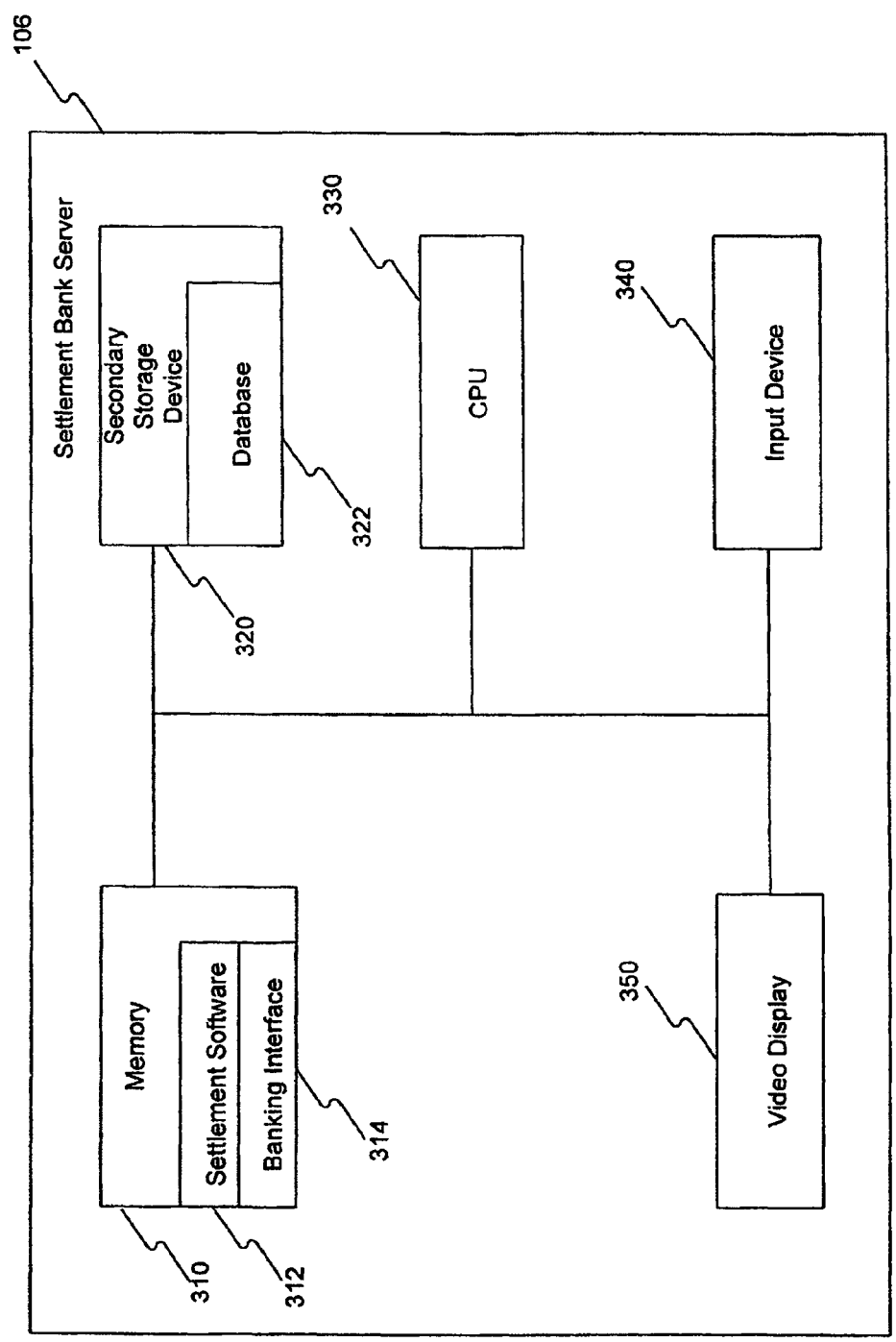
FIG. 3 depicts a more detailed diagram of the settlement bank server depicted in FIG. 1.

As shown in FIG. 3, settlement bank server 106 includes a memory 310, a secondary storage device 320, a CPU 330, an input device 340, and a video display 350. Memory 310 includes settlement software 312 and a banking interface 314. Settlement software 312 dispatches funds to an account associated with the supplier in supplier bank 110 and debits funds from an account associated with the customer in customer bank 108. Settlement software 312 may communicate with computers 102, 104 and banks 108, 110 using banking interface 314. A banking interface is a payment gateway for a bank.

Invoiceless Trading Process

Figure 4:
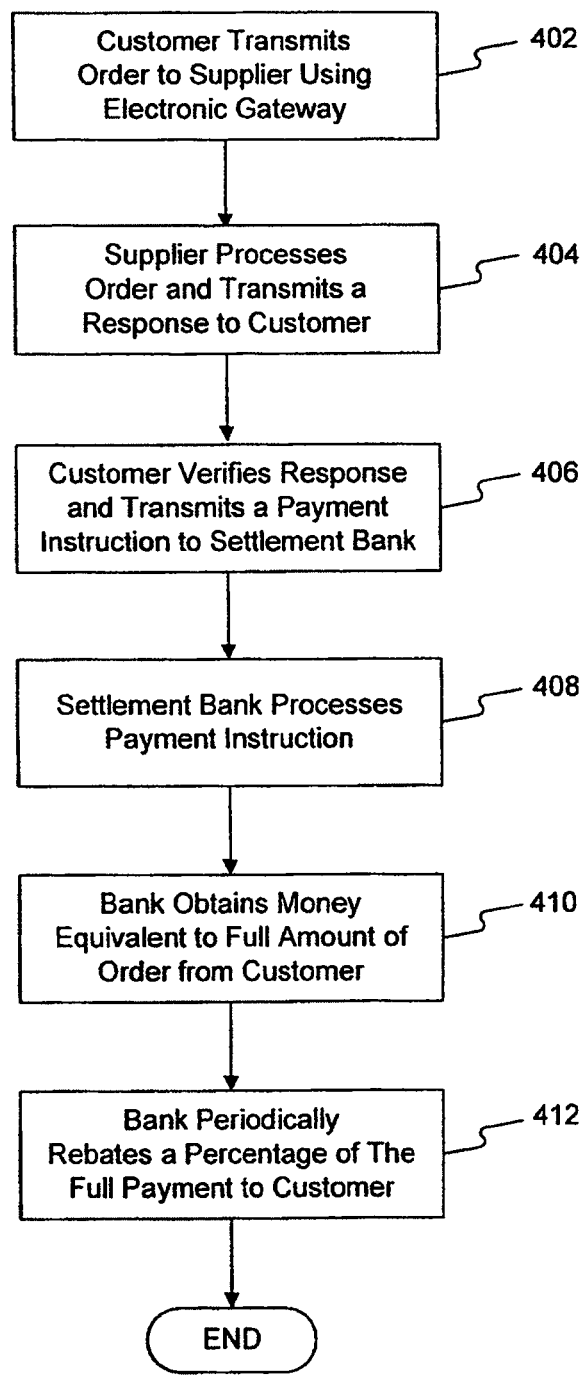
FIG. 4 depicts a flow chart of the steps performed by the invoiceless trading system consistent with the principles of the present invention.

FIG. 4 depicts a flow chart of the steps performed by invoiceless trading system 100 when providing invoiceless trading among customers and suppliers. The first step is for a customer using customer computer 102 to transmit an order to a supplier computer 104 through electronic gateway 120 (step 402). As explained earlier, electronic gateway 120 may translate the customer's order to a format understandable by supplier computer 104 and forward the order to accounting software 262 in supplier computer 104. For example, a supplier may use a Web interface and/or email to provide access to accounting software 262, however the customer may not have email or Web capability and, instead, may have only facsimile capability. The customer may fax a purchase order to a facsimile server (not shown) in electronic gateway 120. Gateway 120 then converts the facsimile to an e-mail and forwards the e-mail to supplier computer 104. Electronic gateway 120 may also maintain a log of all orders placed by the customer in a centralized database for accounting and/or auditing purposes.

If a customer's order contains multiple products from multiple suppliers, (e.g., product A from one supplier, and product B from another supplier), then electronic gateway 120 may create and forward order messages containing appropriate products for each supplier 104.

Next, supplier computer 104 processes the order and transmits a response to customer computer 102 including the status of the order (step 404). The supplier may first send a confirmation message to customer computer 102 indicating that the order can be filled (e.g., the supplier has the product in stock). The supplier may process the order using a "scan-packing" technique. Scan-packing means first determining if the ordered products are available, and if so, scanning the barcodes of the ordered products, creating a packing slip, a delivery label and an ASN immediately prior to shipment of the products. The ASN message is sent to the customer as confirmation that the goods have been shipped, and confirmation of the contents of the shipment. The scan-packing technique ensures customer order integrity and accountability since the technique creates the bar code packing slip, delivery label as well as the ASN message.

At the time of actual shipment (e.g., UPS, Federal Express), the supplier may forward the ASN message to customer computer 102 through electronic gateway 120. Similarly to the customer order in step 402, electronic gateway 120 may transform the electronic message in a format selected by supplier 104 (e.g., e-mail, HTTP request). Electronic gateway 120 translates the ASN to a format understandable by the customer, logs the ASN, and delivers the ASN to customer computer 102.

Once customer computer 102 receives the ASN message, the customer may confirm that the contents of the ASN are identical to the order. And if so, the customer may use customer computer 102 to transmit a payment instruction to settlement software 312 located at settlement bank server 106 (step 406). The customer may use electronic gateway 120, or any other communication means, such as facsimile, to instruct bank server 106 to pay the supplier. The payment instruction may include supplier details (e.g., name, address, bank account number), amount of purchase, discounted amount, and the like. If the customer transmits the payment instruction using electronic gateway 120, electronic gateway 120 may translate the payment instruction into a format understandable by settlement bank server 106, and deliver the instruction to banking interface 314 in bank server 106. For example, if the customer transmits a payment instruction as an e-mail, and settlement bank server 106 requires an Electronic Data Interchange (EDI) format, electronic gateway 120 may translate the payment instruction to an EDI format before forwarding the message to banking interface 314. The customer may transmit the payment instruction regardless of whether or not the actual products have been received. Alternatively, the customer may transmit a payment instruction once the products have been received and/or scan-packed by the customer, or after some other prearranged event, such as issuance of a delivery tracking number by a shipping company.

Regardless of the method used to transmit the payment instruction to settlement bank server 106, once received, settlement software 312 processes the payment instruction (step 408). That is, settlement software 312 first determines the amount to discount the payment and transfers cleared funds (e.g., customer loan, direct deposit) to the supplier's deposit account located at supplier bank 110. Settlement software 312 may determine the amount to discount from the payment instruction received from the customer. To deposit the funds with supplier bank 110, settlement software 312 may use banking interface 314 to wire transfer, prepare a check, or use any other well-known banking network, such as the EDI banking network. In addition, settlement software 312 may issue a remittance advice (e.g., electronic message, facsimile, e-mail) to the supplier by transmitting a notification though electronic gateway 120 to accounting software 262 (though a user interface). If the supplier can not accept an automated remittance, settlement bank 106 may forward the remittance notice in another format, such as facsimile, or mail.

As mentioned before, the discounted payment is prearranged and may be different for each customer and supplier based on a negotiated contract. For example, a supplier may offer a large customer a higher discount, or a supplier may offer a customer that pays within a shorter period of time (e.g., 24 hours of receiving the ASN) a higher discount. Settlement bank server 106 may obtain cleared funds from the customer by providing a loan, or direct withdrawal from the customer's bank account at customer bank 108. One skilled in the art will appreciate that other accounting-exercises between a customer and a supplier may exist, such as the customer and the supplier negotiating a price based on an immediate payment from the customer to the supplier, such that the payment includes a discount. In this case, settlement bank 106 may pay the supplier a full amount without any deduction.

After a credit period measured from the time at which settlement software 312 transfers the discounted funds to supplier bank 110 (e.g., one month), settlement software 312 debits the customer's account at customer bank 108 an amount equivalent to the face value of the payment before any discount (step 410). One skilled in the art will appreciate that other accounting exercises between settlement bank 106 and the customer may exist, such as debiting the amount equivalent to the discounted amount plus any additional bank fees (e.g., wire transfer, handling fees).

For example, if settlement software 312 directly debits the customer's bank account the full amount, a bank or an intermediary software developer may be entitled to a "facility fee" (described below), and/or a bank fee to process any supplier payment. In addition, if settlement bank 106 provides a loan to the customer, settlement bank 106 may also be entitled to an interest fee for the time the bank's funds are outstanding.

Finally, settlement bank 106 periodically (e.g., month, quarterly) rebates to the customer the amount of the discount deducted from the supplier account, less the settlement bank interest on funds for the time outstanding, plus any applicable fees (step 412).

Facility Fee

Electronic gateway 120 may contain added functionality. That is, a software supplier of business to business e-commerce solutions may add various software to electronic gateway 120, such as additional security, additional auditing and/or database functionality, or any other software to enhance financial settlements. The software supplier may request an electronic gateway 120 owner to include a facility fee for each order that uses the suppliers software in electronic gateway 120. The software supplier may license the software to the owners of electronic gateway 120, and in return for the use of the software, electronic gateway 120 may pay a license fee based on a revenue share agreement, or a set percentage based on dollars transacted.

This licensing agreement would therefore enable the software suppliers to charge a facility fee for their software.

CONCLUSION

As explained, systems consistent with the present invention overcome the shortcomings of existing trading systems by providing incentives for customers to pay suppliers within a shortened settlement period. The customer pays a reduced price and the supplier receives payment more quickly reducing the cost of financing its sales.

Although aspects of the present invention are described as being stored in memory, one skilled in the art will appreciate that these aspects may be stored on or read from other computer readable media, such as secondary storage devices, like hard disks, floppy disks, and CD-ROM; a carrier wave received from a network, such as the Internet; or other forms of ROM or RAM. Additionally, although specific components and programs of computers 102, 104 and various bank servers have been described, one skilled in the art will appreciate that these may contain additional or different components or programs.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, other discounts, and/or incentives for the customer may apply. Moreover the described implementation includes software but the present invention may be implemented as a combination of hardware and software or in hardware alone. The invention may be implemented with both object-oriented and non-object-oriented programming systems.

I claim:

1. A system for electronic settlement comprising:
   one or more servers associated with a settlement bank, the one or more servers comprising settlement software, wherein the settlement software enables a funds provider to electronically pay a supplier on a first date an early payment for an order placed by a customer, wherein the early payment is less than a face value of the order by at least an incentive amount, wherein the incentive amount is based at least in part on one or more fiscal attributes of the customer, and
   wherein the settlement software electronically debits, from one or more accounts associated with a customer, a customer payment on a second date, wherein the customer payment is not less than the early payment plus an interest amount, wherein the interest amount is based at least in part on a credit period and the credit period is an amount of time between the first date and the second date.

2. The system of claim 1, wherein the order comprises a shortened settlement period and wherein the incentive amount is further based on the shortened settlement period.

3. The system of claim 1, wherein the customer payment is one of:
no more than the face value,
no more than the face value plus any applicable fees,
equal to the face value of the order, or
not less than the early payment plus the interest amount plus any applicable fees.

4. The system of claim 1, wherein the one or more fiscal attributes of the customer include one or more of: an interest rate of the customer, a cost of funds of the customer, a credit rating of the customer, and an assessed strength of the customer's balance sheet.

5. The system of claim 1, wherein at least one of the one or more servers receives a payment message, wherein the payment message comprises one or more of the face value and the incentive amount.

6. The system of claim 1, wherein the incentive amount is one or more of: negotiated between the customer and the supplier, determined by the settlement bank, and determined by the funds provider.

7. The system of claim 1, further comprising a settlement bank agreement established between the settlement bank and the customer, wherein the settlement bank agreement enables the incentive amount to be based on at least one of the one or more fiscal attributes of the customer.

8. The system of claim 1, wherein the settlement bank and the funds provider are one of: associated with the same institution or associated with different institutions.

9. The system of claim 1, wherein an electronic network is used to communicate at least one message between at least two of: one or more computers associated with the customer, one or more computers associated with the supplier, and one or more computers associated with one or more of: the funds provider and the settlement bank.

10. A method for electronic payment comprising:
receiving a payment message at one or more servers associated with a settlement bank, wherein the payment message enables a funds provider to electronically pay a supplier on a first date an early payment for an order placed by a customer, wherein the early payment is less than a face value of the order by at least an incentive amount, wherein the incentive amount is based at least in part on one or more fiscal attributes of the customer; and
electronically debiting, a customer payment on a second date from one or more accounts associated with the customer using at least one of the one or more servers, wherein the customer payment is not less than the early payment plus an interest amount, wherein the interest amount is determined by at least one of the one or more servers at least in part based on a credit period, wherein the credit period is an amount of time between the first date and the second date.

11. A system for electronic settlement comprising:
one or more servers associated with a settlement bank, the one or more servers storing settlement software, the settlement software comprising:
a paying code segment that enables a funds provider to electronically pay a supplier on a first date an early payment for an order placed by a customer, wherein the early payment is less than a face value of the order by at least an incentive amount, and wherein the incentive amount is based at least in part on one or more fiscal attributes of the customer and a credit period; and
a receiving code segment that enables the funds provider to electronically receive a customer payment on a second date from one or more accounts associated with a customer, wherein the customer payment is: not less than the face value of the order or equal to the face value of the order.

12. The system of claim 11, wherein the order comprises a shortened settlement period and wherein the incentive amount is further based at least in part on the shortened settlement period.

13. The system of claim 11, wherein the customer payment is one of: equal to the face value of the order, no more than the face value of the order plus any applicable fees or not less than the early payment plus the interest amount plus any applicable fees.

14. The system of claim 11, wherein the one or more fiscal attributes of the customer include one or more of: an interest rate of the customer, a cost of funds of the customer, a credit rating of the customer, and an assessed strength of the customer's balance sheet.

15. The system of claim 11, further comprising a settlement bank agreement established between the settlement bank and the customer, wherein the settlement bank agreement enables the incentive amount to be based on at least one of the one or more fiscal attributes of the customer.

16. The system of claim 11, wherein the settlement bank and the funds provider are one of: associated with the same institution or associated with different institutions.

17. The system of claim 11, wherein an electronic network is used to communicate at least one message between at least two of: one or more computers associated with the customer, one or more computers associated with the supplier, and one or more computers associated with one or more of: the funds provider and the settlement bank.

18. A method for electronic settlement comprising:
electronically paying, using one or more computers, a supplier on a first date an early payment for an order placed by a customer, wherein the early payment is less than a face value of the order by at least an incentive amount, wherein the order comprises a shortened settlement period, wherein the incentive amount is based at least in part on one or more fiscal attributes of the customer and a credit period; and
electronically receiving, using the one or more computers, a customer payment on a second date from one or more accounts associated with the customer, wherein the customer payment is not less than the face value of the order.

19. The system of claim 1, wherein the early payment is paid within a shortened settlement period.

20. The system of claim 19, wherein the shortened settlement period is 2 business days.

21. The system of claim 7, wherein the settlement bank and the funds provider are associated with the same institution, and wherein the settlement bank agreement is further established with the funds provider.

22. The system of claim 1, wherein the early payment is paid by the funds provider.

23. The system of claim 22, further comprising a funding agreement between the customer and the funds provider, wherein the funding agreement enables the funds provider to pay the early payment to the supplier.

24. The system of claim 22, wherein the customer payment is made to the funds provider.

25. The system of claim 1, wherein the early payment is paid by the settlement bank.

26. The system of claim 1, further comprising a settlement agreement between the customer and the settlement bank, wherein the settlement agreement enables one or more of the settlement bank and the funds provider to pay the early payment to the supplier.

27. The system of claim 1, wherein the customer payment is made to the settlement bank.

28. The system of claim 1, wherein the customer payment is equal to the face value, and wherein the settlement bank periodically rebates to the customer the interest amount less a settlement bank interest amount and less any applicable fees.

29. The system of claim 1, wherein an advanced shipping notice is received by the customer and at least one of the one or more servers before a payment message is received.

30. The system of claim 19, wherein the shortened settlement period is within 24 hours of receiving an advanced shipping notice.

31. The system of claim 1, further comprising an order message, wherein the order message comprises the face value.

32. The system of claim 1, wherein the incentive amount is further based on the credit period.

33. The system of claim 1, wherein the second date occurs after a standard payment period.

34. The system of claim 1, wherein the second date occurs after a normal trading term.

35. The system of claim 1, wherein one or more of the early payment and the customer payment are paid using a payment gateway.

36. The system of claim 1, wherein the customer payment is debited from the one or more accounts associated with the customer, wherein the one or more accounts associated with the customer are located at one of: the settlement bank; or a customer bank.

37. The method of claim 10, wherein the early payment is paid by the funds provider.

38. The method of claim 37, further comprising a funding agreement between the customer and the funds provider, wherein the funding agreement enables the funds provider to pay the early payment to the supplier.

39. The method of claim 37, wherein the customer payment is made to the funds provider.

40. The method of claim 10, wherein the early payment is paid by the settlement bank.

41. The method of claim 10, further comprising a settlement agreement between the customer and the settlement bank, wherein the settlement agreement enables one or more of the settlement bank and the funds provider to pay the early payment to the supplier.

42. The method of claim 10, wherein the customer payment is made to the settlement bank.

43. The method of claim 10, wherein the customer payment is equal to the face value, and wherein the settlement bank periodically rebates to the customer the interest amount less a settlement bank interest amount and less any applicable fees.

44. The method of claim 10, wherein an advanced shipping notice is received by the customer and at least one of the one or more bank servers before the payment message is received.

45. The method of claim 10, wherein the early payment is paid within a shortened settlement period.

46. The method of claim 10, further comprising receiving an order message, wherein the order message comprises a face value.

47. The method of claim 10, wherein the incentive amount is further based on the credit period.

48. The method of claim 10, wherein the second date occurs after a standard payment period.

49. The method of claim 10, wherein the second date occurs after a normal trading term.

50. The method of claim 10, wherein one or more of the early payment and the customer payment are paid using a payment gateway.

51. The method of claim 10, wherein the order comprises a shortened settlement period and wherein the incentive amount is further based on the shortened settlement period.

52. The method of claim 10, wherein the customer payment is one of:
no more than the face value,
no more than the face value plus any applicable fees,
equal to the face value of the order, or
not less than the early payment plus the interest amount plus any applicable fees.

53. The method of claim 10, wherein the one or more fiscal attributes of the customer include one or more of: an interest rate of the customer, a cost of funds of the customer, a credit rating of the customer, and an assessed strength of the customer's balance sheet.

54. The method of claim 10, wherein the payment message comprises one or more of the face value and the incentive amount.

55. The method of claim 10, wherein the incentive amount is one or more of: negotiated between the customer and the supplier, determined by the settlement bank, and determined by the funds provider.

56. The method of claim 10, further comprising a settlement bank agreement established between the settlement bank and the customer, wherein the settlement bank agreement enables the incentive amount to be based on at least one of the one or more fiscal attributes of the customer.

57. The method of claim 10, wherein the settlement bank and the funds provider are one of: associated with the same institution or associated with different institutions.

58. The method of claim 10, wherein an electronic network is used to communicate the payment message between at least two of: one or more computers associated with the customer, one or more computers associated with the supplier, and one or more computers associated with one or more of: the funds provider and the settlement bank.

59. The method of claim 45, wherein the shortened settlement period is within 24 hours of receiving an advanced shipping notice.

60. The method of claim 45, wherein the shortened settlement period is 2 business days.

61. The method of claim 56, wherein the settlement bank and the funds provider are associated with the same institution, and wherein the settlement bank agreement is further established with the settlement bank.

62. The method of claim 10, wherein the one or more accounts associated with the customer are located at one of: the settlement bank; or a customer bank.

63. The system of claim 11, wherein the early payment is paid within a shortened settlement period.

64. The system of claim 63, wherein the shortened settlement period is 2 business days.

65. The system of claim 15, wherein the settlement bank and the funds provider are associated with the same institution, and wherein the settlement bank agreement is further established with the funds provider.

66. The system of claim 11, wherein the early payment is paid by a funds provider.

67. The system of claim 66, further comprising a funding agreement between the customer and the funds provider, wherein the funding agreement enables the funds provider to pay the early payment to the supplier.

68. The system of claim 66, wherein the customer payment is made to the funds provider.

69. The system of claim 11, wherein the early payment is paid by the settlement bank.

70. The system of claim 11, further comprising a settlement agreement between the customer and the settlement bank, wherein the settlement agreement enables one or more of the settlement bank and the funds provider to pay the early payment to the supplier.

71. The system of claim 11, wherein the customer payment is made to the settlement bank.

72. The system of claim 11, wherein the customer payment is equal to the face value, and wherein the settlement bank periodically rebates to the customer the interest amount less a settlement bank interest amount and less any applicable fees.

73. The system of claim 11, wherein an advanced shipping notice is received by the customer and at least one of the one or more bank servers before a payment message is received.

74. The system of claim 53, wherein a shortened settlement period is within 24 hours of receiving an advanced shipping notice.

75. The system of claim 11, further comprising an order message, wherein the order message comprises the face value.

76. The system of claim 11, wherein the incentive amount is further based on the credit period.

77. The system of claim 11, wherein the second date occurs after a standard payment period.

78. The system of claim 11, wherein the second date occurs after a normal trading term.

79. The system of claim 11, wherein one or more of the early payment and the customer payment are paid using a payment gateway.

80. The system of claim 18, wherein the order comprises a shortened settlement period and wherein the incentive amount is further based on the shortened settlement period.

81. The system of claim 18, wherein the customer payment is one of:
no more than the face value,
no more than the face value plus any applicable fees,
equal to the face value of the order, or
not less than the early payment plus the interest amount plus any applicable fees.

82. The system of claim 18, wherein the one or more fiscal attributes of the customer include one or more of: an interest rate of the customer, a cost of funds of the customer, a credit rating of the customer, and an assessed strength of the customer's balance sheet.

83. The system of claim 18, wherein one or more bank servers receive a payment message, wherein the payment message comprises one or more of the face value and the incentive amount.

84. The system of claim 18, wherein the incentive amount is one or more of: negotiated between the customer and the supplier, determined by a settlement bank, and determined by a funds provider.

85. The system of claim 18, further comprising a settlement bank agreement established between a settlement bank and the customer, wherein the settlement bank agreement enables the incentive amount to be based on at least one of the one or more fiscal attributes of the customer.

86. The system of claim 18, wherein the customer payment is debited by a settlement bank, wherein the settlement bank and the funds provider are one of: associated with the same institution or associated with different institutions.

87. The system of claim 18, wherein an electronic network is used to communicate at least one message between at least two of: one or more computers associated with the customer, one or more computers associated with the supplier, and one or more computers associated with one or more of: a funds provider and a settlement bank.

88. The system of claim 18, wherein the early payment is paid within a shortened settlement period.

89. The system of claim 88, wherein the shortened settlement period is 2 business days.

90. The system of claim 85, wherein the early payment is paid by a funds provider, wherein the settlement bank and the funds provider are associated with the same institution, and wherein the settlement bank agreement is further established with the settlement bank.

91. The system of claim 18, wherein the customer payment is debited from the one or more accounts associated with the customer, wherein the one or more accounts associated with the customer are located at one of: a settlement bank; or a customer bank.

92. The method of claim 18, wherein the early payment is paid by a funds provider.

93. The method of claim 92, further comprising a funding agreement between the customer and the funds provider, wherein the funding agreement enables the funds provider to pay the early payment to the supplier.

94. The method of claim 92, wherein the customer payment is made to the funds provider.

95. The method of claim 18, wherein the early payment is paid by a settlement bank.

96. The method of claim 18, further comprising a settlement agreement between the customer and a settlement bank, wherein the settlement agreement enables one or more of the settlement bank and a funds provider to pay the early payment to the supplier.

97. The method of claim 18, wherein the customer payment is made to a settlement bank.

98. The method of claim 18, wherein the customer payment is equal to the face value, and wherein a settlement bank periodically rebates to the customer the interest amount less a settlement bank interest amount and less any applicable fees.

99. The method of claim 18, wherein an advanced shipping notice is received by the customer and one or more bank servers before a payment message is received.

100. The method of claim 18, wherein the shortened settlement period is within 24 hours of receiving an advanced shipping notice.

101. The method of claim 18, further comprising receiving an order message, wherein the order message comprises the face value.

102. The method of claim 18, wherein the incentive amount is further based on the credit period.

103. The method of claim 18, wherein the second date occurs after a standard payment period.

104. The method of claim 18, wherein the second date occurs after a normal trading term.

105. The method of claim 18, wherein one or more of the early payment and the customer payment are paid using a payment gateway.

106. One or more systems used in electronic settlement of an order placed by a customer with a supplier comprising:
one or more bank servers, at least one of the one or more bank servers that receives a message related to the order, the message comprising an order amount;
a database associated with at least one of the one or more bank servers that stores the order amount;
a processor associated with at least one of the one or more bank servers that determines an incentive amount, wherein the incentive amount is determined based at least in part on one or more fiscal attributes of the customer and the order amount; and a payment gateway associated with at least one of the one or more bank servers, the payment gateway electronically transfers to a supplier account on a first date an early payment for the order, the supplier account associated with the supplier, wherein the early payment is less than the order amount by at least the incentive amount, and the payment gateway that electronically receives a customer payment from a customer account on a second date, the customer account associated with the customer, wherein the customer payment is not less than the early payment plus an interest amount, wherein the interest amount is based at least in part on a credit period, wherein the credit period is an amount of time between the first date and the second date.

107. The system of claim 106, wherein the order comprises a shortened settlement period and wherein the incentive amount is further based the shortened settlement period.

108. The system of claim 106, wherein the customer payment is one of: no more than the face value; no more than the face value plus any applicable fees; or not less than the early payment plus the interest amount plus any applicable fees.

109. The system of claim 106, wherein the one or more fiscal attributes of the customer include one or more of: an interest rate of the customer; a cost of funds of the customer; a credit rating of the customer; and an assessed strength of the customer's balance sheet.

110. The system of claim 106, wherein the message further comprises the incentive amount.

111. The system of claim 106, wherein the incentive amount is one or more of: negotiated between the customer and the supplier; determined by a settlement bank; and determined by a funds provider.

112. The system of claim 106, further comprising a settlement bank agreement between a settlement bank and the customer, wherein the settlement bank agreement enables the incentive amount to be based on at least one of the one or more fiscal attributes of the customer.

113. The system of claim 106, wherein the customer payment is debited by a settlement bank, wherein the settlement bank and the funds provider are one of: associated with the same institution; or associated with different institutions.

114. The system of claim 106, wherein an electronic network is used to communicate the message between at least two of: one or more computers associated with the customer, one or more computers associated with the supplier, and one or more computers associated with one or more of: a funds provider; and a settlement bank.

115. The system of claim 106, wherein the early payment is paid within a shortened settlement period.

116. The system of claim 115, wherein the shortened settlement period is 2 business days.

117. The system of claim 112, wherein the early payment is paid by a funds provider, wherein the settlement bank and the funds provider are associated with the same institution, and wherein the settlement bank agreement is further established with the funds provider.

118. The system of claim 106, wherein the customer payment is debited from the customer account, wherein the customer account is located at one of: a settlement bank; or a customer bank.

119. The system of claim 106, wherein the early payment is paid by a funds provider.

120. The system of claim 119, further comprising a funding agreement between the customer and the funds provider, wherein the funding agreement enables the funds provider to pay the early payment to the supplier.

121. The system of claim 119, wherein the customer payment is made to the funds provider.

122. The system of claim 106, wherein the early payment is paid by a settlement bank.

123. The system of claim 106, further comprising a settlement agreement between the customer and a settlement bank, wherein the settlement agreement enables one or more of the settlement bank and a funds provider to pay the early payment to the supplier.

124. The system of claim 106, wherein the customer payment is made to a settlement bank.

125. The system of claim 106, wherein the customer payment is equal to the face value, and wherein the settlement bank periodically rebates to the customer the interest amount less a settlement bank interest amount and less any applicable fees.

126. The system of claim 106, wherein an advanced shipping notice is received by the customer and at least one of the one or more bank servers before the message is received.

127. The system of claim 115, wherein the shortened settlement period is within 24 hours of receiving an advanced shipping notice.

128. The system of claim 106, further comprising one or more order messages.

129. The system of claim 106, wherein the incentive amount is further based on the credit period.

130. The system of claim 106, wherein the second date occurs after a standard payment period.

131. The system of claim 106, wherein the second date occurs after a normal trading term.

132. One or more systems used in electronic settlement of an order placed by a customer with a supplier comprising:
one or more bank servers configured to receive a payment message, the payment message related to the order, the payment message comprising an order amount, the order amount stored in a database associated with at least one or more of the bank servers;
a processor associated with at least one of the one or more bank servers that determines an incentive amount, wherein the incentive amount is determined based at least in part on one or more fiscal attributes of the customer and the order amount;
a payment gateway associated with at least one of the one or more bank servers, the payment gateway electronically transferring to a supplier account on a first date an early payment for the order, wherein the supplier account is associated with the supplier, wherein the early payment is less than the order amount by at least the incentive amount, and the payment gateway electronically receiving a customer payment from a customer account on a second date, the customer account associated with the customer, wherein the customer payment is not less than the early payment plus an interest amount, wherein the interest amount is based at least in part on a credit period, wherein the credit period an amount of time between the first date and the second date.

133. The system of claim 132, wherein the order comprises a shortened settlement period and wherein the incentive amount is further based the shortened settlement period.

134. The system of claim 132, wherein the customer payment is one of: no more than the face value; no more than the face value plus any applicable fees; or not less than the early payment plus the interest amount plus any applicable fees.

135. The system of claim 132, wherein the one or more fiscal attributes of the customer include one or more of: an interest rate of the customer; a cost of funds of the customer; a credit rating of the customer; and an assessed strength of the customer's balance sheet.

136. The system of claim 132, wherein the payment message further comprises the incentive amount.

137. The system of claim 132, wherein the incentive amount is one or more of: negotiated between the customer and the supplier; determined by a settlement bank; and determined by a funds provider.

138. The system of claim 132, further comprising a settlement bank agreement between the settlement bank and the customer, wherein the settlement bank agreement enables the incentive amount to be based on at least one of the one or more fiscal attributes of the customer.

139. The system of claim 132, wherein the customer payment is debited by a settlement bank, wherein the settlement bank and the funds provider are one of: associated with the same institution; or associated with different institutions.

140. The system of claim 132, wherein an electronic network is used to communicate the payment message between at least two of: one or more computers associated with the customer, one or more computers associated with the supplier, and one or more computers associated with one or more of: a funds provider; and a settlement bank.

141. The system of claim 132, wherein the first date occurs within a shortened settlement period.

142. The system of claim 141, wherein the shortened settlement period is 2 business days.

143. The system of claim 138, wherein the early payment is paid by a funds provider, wherein the settlement bank and the funds provider are associated with the same institution, and wherein the settlement bank agreement is further established with the settlement bank.

144. The system of claim 132, wherein the customer account is located at one of: the settlement bank; or a customer bank.

145. The system of claim 132, wherein the early payment is paid by a funds provider.

146. The system of claim 145, further comprising a funding agreement between the customer and the funds provider, wherein the funding agreement enables the funds provider to pay the early payment to the supplier.

147. The system of claim 145, wherein the customer payment is made to the funds provider.

148. The system of claim 132, wherein the early payment is paid by a settlement bank.

149. The system of claim 132, further comprising a settlement agreement between the customer and a settlement bank, wherein the settlement agreement enables one or more of the settlement bank and a funds provider to pay the early payment to the supplier.

150. The system of claim 132, wherein the customer payment is made to a settlement bank.

151. The system of claim 132, wherein the customer payment is equal to the face value, and wherein a settlement bank periodically rebates to the customer the interest amount less a settlement bank interest amount and less any applicable fees.

152. The system of claim 132, wherein an advanced shipping notice is received by the customer and at least one of the one or more bank servers before the payment message is received.

153. The system of claim 141, wherein a shortened settlement period is within 24 hours of receiving an advanced shipping notice.

154. The system of claim 132, further comprising an order message, wherein the order message comprises the order amount.

155. The system of claim 132, wherein the incentive amount is further based on the credit period.

156. The system of claim 132, wherein the second date occurs after a standard payment period.

157. The system of claim 132, wherein the second date occurs after a normal trading term.

158. The system of claim 11, wherein at least one of the one or more servers receives a payment message, wherein the payment message comprises one or more of the face value and the incentive amount.

159. The system of claim 11, wherein the incentive amount is one or more of: negotiated between the customer and the supplier; determined by a settlement bank; and determined by the funds provider.

160. The system of claim 11, wherein the customer payment is debited from the one or more accounts associated with the customer, wherein the one or more accounts associated with the customer are located at one of: the settlement bank; or a customer bank.

* * * * *